April 1, 1969   D. E. CLARK ET AL   3,435,670
FORCE MEASURING SYSTEM WITH NONLINEAR NETWORK
Filed July 14, 1966   Sheet 1 of 3

INVENTORS
DONALD E. CLARK
BY  MELVIN O. EIDE

Harvey J. Lawhurst

ATTORNEY

INVENTORS
DONALD E. CLARK
BY MELVIN O. EIDE

ATTORNEY

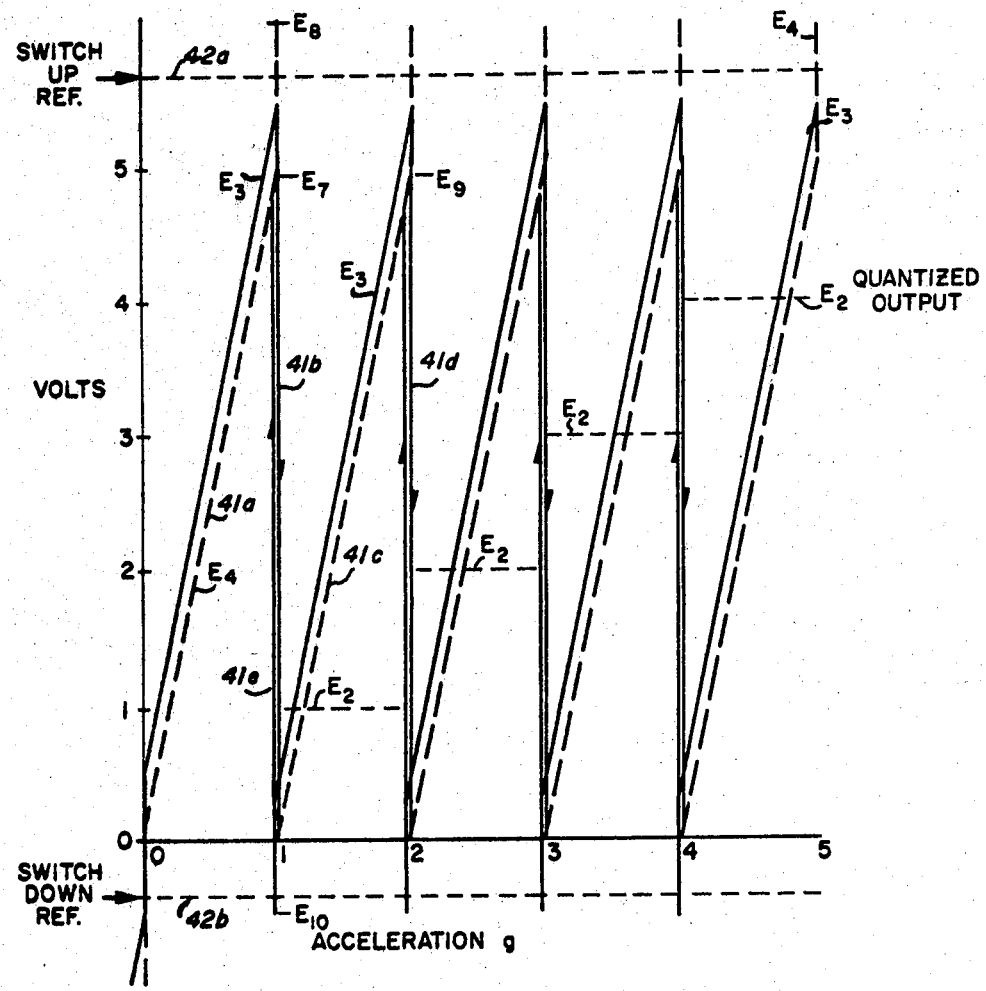
Fig_4b

United States Patent Office 3,435,670
Patented Apr. 1, 1969

3,435,670
FORCE MEASURING SYSTEM WITH
NONLINEAR NETWORK
Donald E. Clark, Redmond, and Melvin O. Eide, Seattle,
Wash., assignors to United Control Corporation, Redmond, Wash., a corporation of Delaware
Filed July 14, 1966, Ser. No. 565,239
Int. Cl. G01l 5/12
U.S. Cl. 73—141                                     8 Claims

ABSTRACT OF THE DISCLOSURE

A force measuring system of the servo type having a sensing element movable in response to the force to be measured, a detector means which is responsive to the displacement of the sensing means from some zero position and which provides an error signal, and a restoring system which exerts a restoring force on the sensing element to oppose its movement in response to the force to be measured. The error signal is applied to the restoring system through a nonlinear network which has transitions at selected values of the error signal to emphasize changes in the amplitude of the error signal when the force being measured has selected values.

---

This invention relates in general to force measuring systems, and relates more particularly to such systems of the servo type.

Force measuring systems of the servo type employing oscillatory circuits are well-known. In one particular system, described and claimed in U.S. Patent No. 3,213,694 dated Oct. 26, 1965, and assigned to the same assignee as the present application, the input force to be measured is caused to vary the tuning of an oscillator to produce an amplitude modulated output therefrom. This output signal is supplied to a restoring or balance coil in the force measuring apparatus to balance the force acting upon the device. The current through the restoring or balance coil is thus a measure of the force acting on the apparatus, and this current is utilized to develop a voltage across a fixed load impedance which is a precise measure of the input force.

The output voltage from such systems is some function of the input force, and in some applications it is desirable to produce a relatively abrupt change in this output voltage at one or more different values of the force being measured. For example, in accelerometers, it is sometimes desirable to produce a large change in output when the acceleration being measured passes through zero. Heretofore, it has been proposed to produce somewhat of a step change in the output of an accelerometer when this output passes through zero by utilizing a pair of diodes in the output circuit such that they became conductive when the output passes through zero. This does produce somewhat of a step change in the output signal, but it is not completely satisfactory because the step change produced is not large enough to be utilized to operate other devices, such as relays and the like, without amplification. Further, this system has the disadvantage that it is operable only to produce step changes when the measured force passes through zero and is not operable to provide such steps at other values of force. Additionally, this prior art system has the disadvantage that if there is a significant amount of vibration present, in addition to the acceleration being measured, this vibration may cause the step output to oscillate or hunt because of the steep conductivity characteristics of the diodes.

In accordance with the present invention, there is provided a force measuring system of the servo type employing a nonlinear network in the output which may provide one or more large changes in output signal at different values of the force being measured. In one embodiment, the nonlinear network comprises elements which are capable of producing a substantial output voltage change in response to the measured force reaching or passing through some predetermined value or values, and this output voltage change is sufficient to operate a relay or the like without amplification. In another embodiment of the invention, a bias is supplied to the nonlinear network so that it is operative to produce an abrupt output voltage change at some value other than zero, thus permitting its use to produce step output signals at any desired value of the measured force. In an additional embodiment, the operation of the nonlinear network may be modified during operation so that it is switched in one direction at one value of the force being measured and is switched in the other direction at a different value of the force. This "hysteresis" effect results in a more stable operation of the system, since the difference in force levels required to switch the nonlinear network prevents the effects of vibration and the like from causing the system to hunt or oscillate as discussed above for the prior art devices.

In a further embodiment of the invention, the nonlinear network may have a plurality of switch points corresponding to different levels of the force being measured. Each increment between switch points may correspond to a range of the measured force, and full scale output of the system may be provided for each such increment. Thus, improved accuracy is obtained by breaking down the entire range of measured force into a plurality of increments and providing full scale system output for each such increment.

It is therefore an object of this invention to provide an improved force measuring system of the servo type employing a nonlinear network in the output to modify the output signal from the system.

It is a further object of this invention to provide a force measuring system of the servo type employing a nonlinear network in the output to provide a large variation in the output signal when the measured force passes through zero.

It is an additional object of the present invention to provide a force measuring system of the servo type employing a nonlinear network in the output to provide an abruptly varying output signal for at least one value of the force being measured.

It is an additional object of the present invention to provide a force measuring system of the servo type employing a nonlinear network in the output to provide an abruptly varying output signal at any selected value of the measured force.

It is a further object of this invention to provide a force measuring system of the servo type employing a nonlinear network in the output to provide an abruptly varying output signal at any selected value of the measured force, the value of the force at which the nonlinear network becomes effective when the force is changing in one direction being different than the value at which it becomes effective when the force is changing in the other direction.

It is an additional object of the present invention to provide a force measuring system of the servo type employing a nonlinear network in the output, the nonlinear network being switchable at a plurality of different values of the measured force to vary the response of the system over a number of increments of the measured force.

Other objects and advantages of the present invention will be apparent from the following description when read in connection with the accompanying drawings, in which:

FIGURE 1b is a graph showing the current-voltage relationship for the nonlinear network of FIGURE 1a;

FIGURE 1e is a graph illustrating the relationship between the measured force and the system output signal for the system of FIGURE 1a;

FIGURE 2b is a graph illustrating the relationship between the measured force and the system output signal for the system of FIGURE 2a;

FIGURE 3b is a graph illustrating the relationship between the measured force and the system output signal for the system of FIGURE 3a;

FIGURE 4b is a graph illustrating the relationship between the measured force and the system output signal for the system of FIGURE 4a.

Figure 1A:
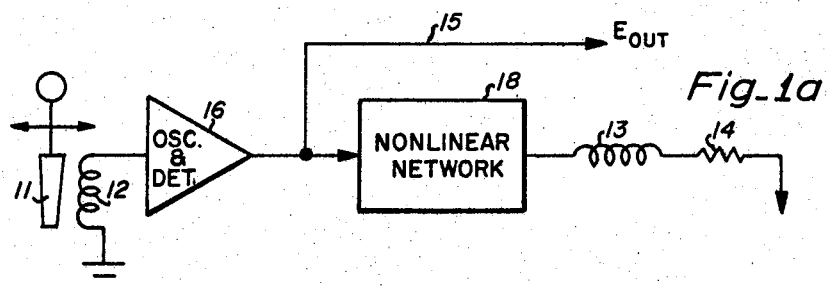
FIGURE 1a is a schematic block diagram of a force measuring system employing a nonlinear network to produce an abrupt and substantial change in the system output when the measured force passes through zero.

Referring to FIGURE 1a, the invention is illustrated in connection with a force measuring system which may include an accelerometer. The force measuring system may be of any suitable type, but preferably is similar to that shown in the above-described U.S. Patent No. 3,213,694. This system may include a movable element 11 which is subject to the force to be measured and which moves relative to a coil 12 in response to this force. Coil 12 forms part of an oscillating circuit, and movement of element 11 relative to this coil varies the oscillating properties of the circuit to thus vary the output therefrom. In a servo type system, the oscillator output is utilized to control the direction and amplitude of the output current which is supplied to a restoring or balancing coil 13 which is physically located adjacent movable element 11, to balance the externally applied force on element 11 so that when a balance is reached, no further displacement takes place.

The system therefore is in the nature of a force balance servo amplifier system in which minute deflections of the moving system produce a low impedance output voltage which causes a precise current through the rebalance coil to provide a restoring force to balance the suspended mass 11 against the externally applied forces to be measured. The output voltage of the system $E_{out}$ is the amplifier error signal which has an amplitude proportional to the displacement of movable element 11 from a no error position and appears on a conductor 15. This voltage is usually referred to as the system output signal or simply the output signal. The current I supplied to restoring coil 13, also referred to as the output current or restoring current, is measured by the voltage appearing across a load resistor 14 which will be referred to as the analog voltage or analog signal. The analog signal is a measure of the magnitude of the output current necessary to create a force to balance the suspended mass, and consequently is a measure of the acceleration applied to movable element 11.

In practice, the system would include an oscillator connected to coil 12, an amplitude detector for demodulating the amplitude modulated output of the oscillator, and one or more amplifier stages thereafter. In FIGURE 1a and the subsequent figures, this circuitry is represented schematically by element 16.

Figure 1B:
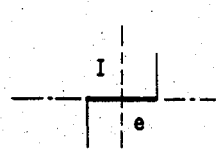

In accordance with the present invention, there is provided a network or device 18 for modifying the output voltage from the system at a predetermined value of the measured force. In the system of FIGURE 1a, it is assumed that the system is to produce an abrupt and substantial change in output voltage when the measured acceleration passes through zero. To accomplish this, network 18 should have a voltage-current characteristic as shown graphically in FIGURE 1b. As indicated by this graph, the voltage and current undergo abrupt transitions at predetermined values. This results in an output characteristic for the system as shown in FIGURE 1e, where output voltage is plotted against acceleration. As indicated by this graph, the output voltage increases linearly with the measured acceleration until the acceleration reaches zero, at which time nonlinear network 18 undergoes a transition. This produces an abrupt and substantial change in the system output voltage from $E_1$ to $E_2$, and this substantial change may be utilized to operate a relay or the like, without amplification, to provide an indication or initiate an operation in response to the acceleration passing through zero.

Figure 1C:
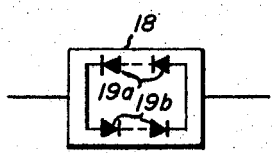
FIGURE 1c shows one embodiment of a nonlinear network suitable for use in the present invention.

FIGURE 1c illustrates one type of circuitry suitable for use in nonlinear network 18. In this embodiment, the network comprises two parallel branches, each of which has a plurality of diodes therein. The diodes 19a in one branch are poled oppositely to those 19b in the other branch, and the resulting circuit has a characteristic as shown in FIGURE 1b. In the embodiment shown in FIGURE 1d, network 18 is comprised of a double anode Zener diode 20 which produces the desired transition characteristic.

Figure 1D:
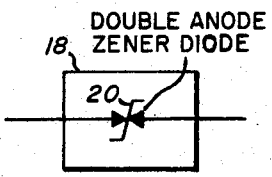
FIGURE 1d shows an alternate embodiment of a nonlinear network employing a double anode Zener diode.
Figure 2A:
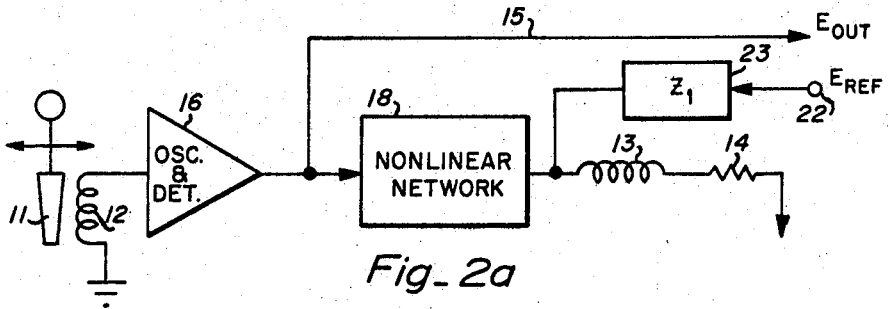
FIGURE 2a is a schematic block diagram of a force measuring system employing a nonlinear network to produce an abrupt and substantial change in the system output when the measured force passes through some value other than zero.
Figure 1E:
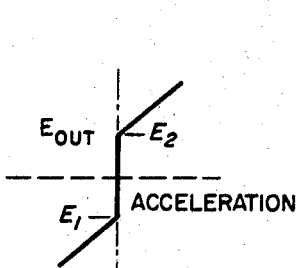

In both the embodiments of FIGURES 1c and 1d, the circuitry is capable of producing a substantial change in the system output voltage, as from $E_1$ to $E_2$ in FIGURE 1e, and unlike the prior art systems, this voltage change is sufficient to operate a relay or the like without amplification.

Where an indication is desired when the measured acceleration reaches or passes through some value other than zero, the embodiment shown in FIGURE 2a, may be employed. Like the embodiment of FIGURE 1a, this system includes movable element 11 which is acted upon by the force to be measured and which moves relative to coil 12 in the oscillator circuit. Restoring coil 13 is also provided as before, and load resistor 14 is employed to develop the analog signal. Network 18 is employed, as before, but it is provided with a bias signal which serves to vary the operating point of the nonlinear network. This bias signal may be supplied by any suitable means such as a source of reference voltage supplied to a terminal 22, which in turn is connected to one terminal of suitable active or passive conductance such as a bias impedance 23. The other terminal of bias impedance 23 is connected to the junction of network 18 and restoring coil 13, so that the reference signal is effective to bias network 18.

Figure 2B:
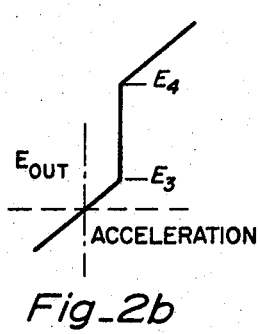

The magnitude and polarity of the bias signal may be selected to produce operation of network 18 at any desired value of the measured acceleration. In the graph of FIGURE 2b, it is assumed that it is desired to have an abrupt change in the output voltage at an acceleration $A_1$, and the signal from the bias circuit is adjusted to produce this operation by shifting the operating point of network 18 so that it occurs as shown in FIGURE 2b. Thus, as the acceleration decreases toward zero and then passes through zero to increase in the other direction, the voltage output of the system varies linearly therewith until the acceleration reaches the value $A_1$. At this value, nonlinear network operates to produce an abrupt and substantial step in the output voltage, as from $E_3$ to $E_4$. Thereafter, the output voltage varies linearly with the measured acceleration.

As in the embodiment of FIGURE 1a, the amount of the voltage variation produced by this invention at the selected acceleration is sufficient to operate a relay or the like without amplification. It will be apparent from FIGURES 2a and 2b that the invention is operable to provide a step output voltage at any desired value of acceleration, the particular value being determined by the polarity and magnitude of the bias signal supplied from the reference source.

As indicated above, where vibration is acting on the accelerometer, there may be a tendency for the system output voltage to hunt or oscillate if the measured acceleration is at or near the value at which the system produces the step output. The cause of such hunting or oscillation will be apparent from the graphs of FIGURES 1e and 2b, where the steep transition portion of the curves clearly indicates that relatively small amounts of vibration could influence the accelerometer so as to produce oscillations of the system output voltage between $E_1$ and $E_2$ for FIGURE 1e, and between $E_3$ and $E_4$ for FIGURE 2b. Such oscillation or hunting is undesirable, of course, and the system of FIGURE 3a may be employed to eliminate it.

Figure 3B:
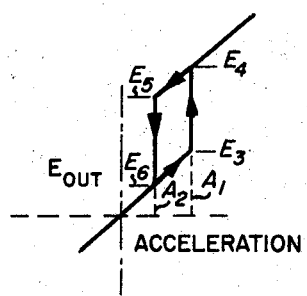
Figure 3A:
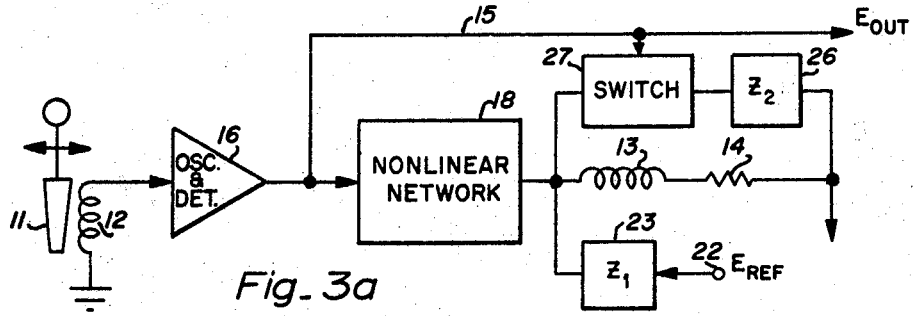
FIGURE 3a is a schematic block diagram of a force measuring system employing a nonlinear network to produce a system output having a "hysteresis" loop therein.

The embodiment of FIGURE 3a is similar to that of FIGURE 2a and includes the reference potential supplied through terminal 22 and impedance 23 to the junction of network 18 and restoring coil 13. The circuit also includes a second impedance 26 which is selectively connectable in parallel with impedance 23 by means of a switch 27. Switch 27 receives a controlling input from the system output conductor 15, and this switch remains normally open until the system output voltage reaches a predetermined level, at which time switch 27 closes to connect impedance 26 across impedance 23. This has the effect of modifying the operating characteristics of network 18 to produce a "hysteresis" effect, as will be apperent from the graph of FIGURE 3b.

As shown in that graph, the system output voltage increases linearly with the measured acceleration until the acceleration reaches a value, $A_1$, at which value the system is adjusted to provide a step output increase, as in the embodiment of FIGURE 2a. The output voltage thus increases abruptly from $E_3$ to $E_4$, and in doing so exceeds the switching voltage level $E_s$ at which switch 27 is set to operate. Switch 27 thus closes to connect impedance 26 in the circuit to thus modify the operating characteristics of network 18. This modification results in the transition level for network 18 being shifted downwardly from $A_1$ to $A_2$. Thus, if the acceleration should decrease after reaching $A_1$ and causing the system output voltage to jump from $E_3$ to $E_4$, the acceleration would have to decrease to $A_2$ before network 18 would undergo a transition to produce a step output. During this decrease, the system output voltage would decrease linearly from $E_4$ to $E_5$, at which time network 18 would undergo a transition to abruptly decrease the output voltage to the value $E_6$ at the acceleration $A_2$.

The output voltage thus traces a type of "hysteresis" loop, and it will be seen the difference between the vertical portions of this loop represents the amount of acceleration required to switch network 18. Hence, this difference also represents a stability factor to prevent vibration from causing the system output to hunt or oscillate, since it will be seen that after the output voltage jumps $E_3$ to $E_4$, if vibration is present which would appear to decrease the acceleration, the system output would decrease linearly from the value $E_4$ and would not produce a downward step until the value $E_5$ was reached. Thus, the difference between the values $A_1$ and $A_2$ may be made sufficiently large to accommodate any expected vibration, to prevent hunting or oscillating of the system output at the transition point. When the voltage decreases from $E_5$ to $E_6$, it drops below the switching voltage level $E_s$, so that switch 27 is opened to disconnect impedance 26 from the circuit. Thus, when the voltage increases from $E_6$, it must reach $E_3$ before network 18 again undergoes a transition.

Figure 4A:
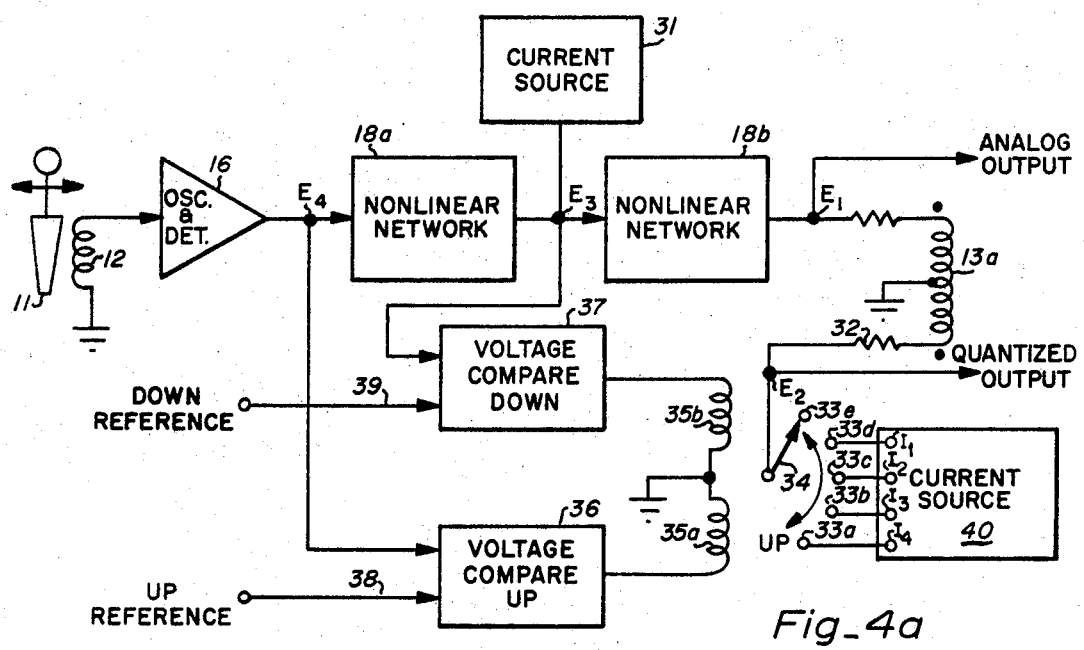
FIGURE 4a is a schematic block diagram of a force measuring system employing a nonlinear networks to produce a plurality of incremental steps in the system output signal.

FIGURE 4a represents an embodiment useful for producing a plurality of incremental steps in the system output signal. In this embodiment, two nonlinear networks, 18a and 18b, are employed. These networks are connected as shown, and have a constant current bias source 31 connected to the junction thereof. The restoring coil is in the form of a bifilar wound coil 13a having a center tap connected to ground. One terminal of coil 13a is connected through a resistor 32 to the contact arm 34 of a stepping switch having a pair of stepping windings 35a, 35b. Contact arm 34 is selectively engageable with one of a plurality of contacts 33a, 33b, 33c, and 33d, which are in turn connected to different current sources represented by $I_1$, $I_2$, $I_3$, and $I_4$ in a current source 40. Contact arm 34 may also engage a dummy contact 33e, which is not connected to current source 40.

Stepping windings 35a, 35b are energized by voltage compare networks shown at 36 and 37. Compare network 36 receives one input, identified as $E_4$, from the junction of element 16 and network 18a, and receives a reference input from an "up" reference conductor 38. Compare network 37 receives one input, identified as $E_3$, from the junction of networks 18a, 18b, and receives a reference input from a "down" reference coductor 39. Voltage compare networks 36, 37 operate to compare their respective input voltages $E_4$, $E_3$, with their associated reference voltages and produce output pulses to stepping windings 35a, 35b when the input voltages exceed or are less than, respectively, the reference voltages.

The operation of the embodiment of FIGURE 4a can best be understood from the graphs of FIGURE 4b. Assume that the acceleration being measured is increasing from zero, so that the system output voltage is represented by the portion 41a of the curve. Under these conditions, switch contact arm 34 is at the extreme left position, engaging dummy contact 33e, so that the characteristics of the system are determined only by the reference potential of current source 31. When the output voltage reaches a value $E_7$, corresponding to the first value of acceleration at which a transition is to be produced, the bias on network 18a is such that it undergoes a transition, causing the system output voltage to rise rapidly to a value $E_8$ determined by the characteristics of the network. In so doing, the output voltage exceeds the value of the "up" switch level reference voltage supplied to voltage compare network 36 on conductor 38 and represented in FIGURE 4b by line 42a. This causes voltage compare network 36 to produce an output pulse which is supplied to stepping winding 35a to step contact arm 34 one step in a clockwise or "up" direction. This moves contact arm 34 from dummy contact 33e to contact 33d, thus connecting current source $I_1$ to current source 31 in the bias circuit for network 18a. Current $I_1$ is preferably slightly smaller than the current from source 31, and this modifies the characteristics of network 18a so that it undergoes a transition in the opposite direction, causing the system output voltage to decrease from the value $E_8$ to substantially zero along portion 41b of the curve.

Assuming that the acceleration continues to increase, the system output voltage then increases linearly from zero along portion 41c of the curve until it reaches a value $E_9$, corresponding to another value of acceleration at which a transition is to be produced. At this point, network 18 undergoes a transition and the system output voltage rises rapidly again to the value $E_8$. In so doing, the output voltage again exceeds the "up" switch level reference voltage, causing voltage compare network 36 to supply another stepping pulse to winding 35a to move contact arm 34 from contact 33d to contact 33c. This connects current $I_2$, which has a value different than that of current $I_1$, to source 31 to thus modify the characteristics of network 18a. Network 18a thereupon undergoes a transition in the opposite direction, causing the output voltage to again decrease to substantially zero, along portion 41d of the curve.

This operation continues as the acceleration increases, to provide a plurality of switch points for network 18a by modifying the bias supplied thereto as the acceleration varies.

When the acceleration is decreasing, the operation of the system is similar to that described above to provide a plurality of switch points. For example, assume that the acceleration is decreasing from a value slightly below the voltage $E_9$ in FIGURE 4b. The output voltage decreases linearly along portion 41c of the curve, while the voltage at $E_3$ similarly decreases as shown by the curve. This continues until the voltage approaches zero, at which time network 18b undergoes a transition, causing the voltage $E_3$ to decrease rapidly to a value $E_{10}$. In so decreasing, the voltage becomes less than the "down" switch level reference voltage, represented by line 42b. This causes "down" voltage compare network 37 to generate a stepping pulse which is supplied to stepping winding 35b to move contact arm 34 in a counterclockwise direction from contact 33d to contact 33e. This modifies characteristics of network 18b so that it undergoes another transition and the system output voltage rises along portion 41e of the curve to the point $E_7$.

This operation then continues as the acceleration decreases to produce different switch points for network 18b at a plurality of selected values of acceleration.

The embodiment of FIGURE 4a has a number of applications, and is particularly suited for use where the system output is to be telemetered. In conventional telemetry employing FM modulation and demodulation, the accuracy of the telemetry equipment is usually no better than 5%, so that even if the transducing equipment, such as the accelerometer system of the present invention, is capable of an accuracy of 0.1%, the overall accuracy is still no better than 5.1% if the entire acceleration range is to be covered by a single range of the transducing equipment. However, by employing the embodiment of the present invention shown in FIGURE 4a, this accuracy can be considerably improved. By assigning each of the increments between switch points in the graph of FIGURE 4b to a portion of the range of accelerations to be measured and by providing the full range of accelrmoeter output for each such increment, the accuracy can be improved by a factor dependent upon how many different increments are utilized.

For example, if a range of acceleration from zero to 5g's is to be measured, the range between switch points may be selected to be 1g, assuming five increments are to be employed as shown in FIGURE 4b. Thus, the first increment would correspond to the range from zero to 1g, the second increment to the range from 1g to 2g's etc. Assuming the accelerometer has a range of output voltage from zero to 5 volts, this full range is available for each of the increments of acceleration, so that the accuracy of the system is 5.1% of 1g, rather than 5.1% of 5g's as it would be with the prior art systems where the entire acceleration range is covered in one increment.

The use of the embodiment of FIGURE 4a in the above telemetry application would require the transmission of a signal indicating which range or increment of acceleration the system was operating in, but the increased accuracy obtainable would more than offset the additional cost of this extra transmission in many applications. This additional signal is readily obtainable from the quantized voltage $E_2$ in FIGURE 4a and shown graphically in FIGURE 4b.

In the above discussion of the embodiment of FIGURE 4a, it was assumed that equal increments of acceleration were provided between the switch points, but it will be apparent that these increments need not necessarily be equal and that any desired increments can be provided by proper selection of the values of currents $I_1$, $I_2$, $I_3$, etc. in source 40. Further, although an electromechanical stepping switch was illustrated to control the connection of the different bias impedances, it will be apparent that other devices, such as a digital shift register, may be employed with equal facility.

Figure 5:
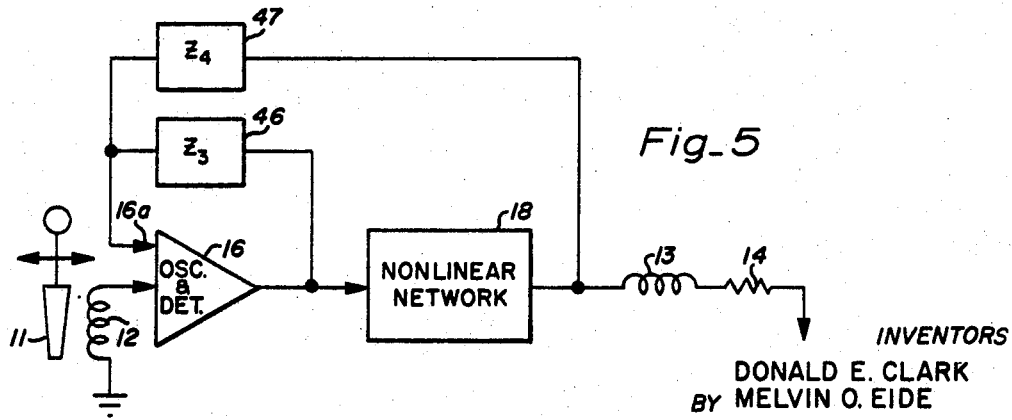
FIGURE 5 is a schematic block diagram showing the use of two feedback impedances in the force measuring system of the present invention.

The embodiment of FIGURE 5 illustrates the use of two feedback impedances in connection with a force measuring system employing the nonlinear network of this invention. One impedance 46 has one terminal connected to the output of oscillator and detector 16 and has its other terminal connected to a position pickoff gain control terminal 16a on the input of element 16. Impedance 46 is effective to control the gain and output impedance of element 16 during the time network 18 is being switched, and this impedance thus controls the response time during switching.

A second impedance 47 has one terminal connected to the junction of network 18 and restoring coil 13 and has its other terminal connected to input terminal 16a. This latter impedance is effective to control the response characteristics of the system at all times other than during switching.

Although the above description has been in connection with a system for measuring acceleration, it will be apparent that this invention is equally useful in systems for measuring other forces, such as pressure and the like.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A force measuring system of the servo type, comprising:
    a sensing element movable in response to the force to be measured;
    a first coil positioned adjacent said sensing element and magnetically coupled thereto;
    an ascillator circuit including said first coil;
    detector means connected to said oscillator circuit for detecting variations in the output of said oscillator circuit in response to variations in the force acting on said sensing element to produce an output signal;
    a second coil connected to the output of said detector means and magnetically coupled to said sensing element for exerting a restoring force on said element to oppose movement thereof in response to variations in said measured force, the current through said second coil being a measure of the force required to oppose movement of said element and hence being a measure of the magnitude of the force to be measured;
    a nonlinear network connected between said detector means and said second coil, said nonlinear network undergoing trasistions at predetermined values of said output signal;
    bias means connected to said network to cause said network to undergo a first transistion in one direction at a first value of said output signal; and
    switch means operated in response to said first transition for modifying said bias means to cause said network to undergo a second transistion in the other direction at a second value of said output signal different from said first value.

2. A system in accordance with claim 1 in which said bias means includes a source of reference potential and first impedance means connected to said network; and
    second impedance means connectable in parallel with said first impedance means by said switch means for modifying the bias on said network to thereby modify the transition point thereof.

3. A system in accordance with claim 1 including a pair of nonlinear networks; and
    variable bias means connected to said networks, said variable bias means including means responsive to a transition of one of said networks for varying the value of said output signal at which said network undergoes a transition, said variable bias means thereby producing a series of transition points for said network with a predetermined increment of said output signal between adjacent ones of said transition points.

4. A system in accordance with claim 3 in which all of said predetermined increments are equal.

5. A system in accordance with claim 3 in which said variable bias means includes:
voltage compare means for comparing the output signal of said system with a reference signal;
a plurality of current sources; and
means responsive to said voltage compare means for selectively connecting one of said current sources to one of said networks to modify the transition point of said network.

6. A force measuring system of the servo type comprising:
a sensing element movable in response to the force to be measured;
detector means responsive to said sensing element and operative to provide an output signal which is commensurate with the displacement of said sensing element from a given position;
restoring means operatively coupled to said sensing element for exerting a restoring force on said sensing element to oppose movement thereof in response to variations in the force to be measured, said restoring means being responsive to an analog signal whose amplitude is proportional to the force required to oppose movement of said sensing element and hence the force to be measured;
nonlinear network means responsive to said output signal and operative to develop said analog signal; and
said nonlinear network having a first transition at a first value of said output signal and a second transition at a second value of said output signal, the change produced in said developed analog signal by a unit change in said output signal being smaller for output signals lying between said first and second values than outside thereof.

7. A force measuring system in accordance with claim 6 in which said nonlinear network means is operative to develop a substantially constant analog signal for all values of said output signal lying between said first and said second values.

8. A force measuring system in accordance with claim 6 in which the relationship between said output signal and said developed analog signal is substantially constant outside the range of output signal lying between said first and second values.

References Cited

UNITED STATES PATENTS

| | | | |
|---|---|---|---|
| 3,040,575 | 6/1962 | Sable | 73—211 |
| 3,293,911 | 12/1966 | Ziegler | 73—141 |
| 2,733,911 | 2/1956 | Thurston | 77—211 |
| 3,058,700 | 10/1962 | Hecht | 73—178 |
| 3,062,059 | 11/1962 | Singleton | 73—517 |

CHARLES A. RUEHL, Primary Examiner.

U.S. Cl. X.R.

73—517